(12) United States Patent
Cai

(10) Patent No.: US 10,515,251 B2
(45) Date of Patent: Dec. 24, 2019

(54) SCREEN ASSEMBLY WITH A FINGERPRINT MODULE AND ELECTRONIC DEVICE

(71) Applicant: SHENZHEN GOODIX TECHNOLOGY CO., LTD., Shenzhen, Guangdong (CN)

(72) Inventor: Jun Cai, Guandong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 206 days.

(21) Appl. No.: 15/708,239

(22) Filed: Sep. 19, 2017

(65) Prior Publication Data

US 2018/0089492 A1 Mar. 29, 2018

Related U.S. Application Data

(63) Continuation of application No. PCT/CN2016/100961, filed on Sep. 29, 2016.

(51) Int. Cl.
*G06K 9/00* (2006.01)
*H04N 5/247* (2006.01)
*G06F 3/0488* (2013.01)

(52) U.S. Cl.
CPC ....... *G06K 9/00013* (2013.01); *G06F 3/0488* (2013.01); *G06K 9/00087* (2013.01); *H04N 5/247* (2013.01)

(58) Field of Classification Search
CPC combination set(s) only.
See application file for complete search history.

(56) References Cited

U.S. PATENT DOCUMENTS

| 2008/0049980 | A1  | 2/2008  | Castaneda et al.       |
|--------------|-----|---------|------------------------|
| 2012/0070140 | A1  | 3/2012  | Chow et al.            |
| 2013/0307818 | A1  | 11/2013 | Pope et al.            |
| 2014/0233161 | A1* | 8/2014  | Liu .......... C03C 15/00 |
|              |     |         | 361/679.01             |
| 2016/0056527 | A1  | 2/2016  | Pascolini et al.       |
| 2017/0147850 | A1* | 5/2017  | Liu .......... G06K 9/0002 |
| 2017/0344785 | A1* | 11/2017 | Zhang ........ G06K 9/0004 |

(Continued)

FOREIGN PATENT DOCUMENTS

| CN | 104049803 A  | 9/2014  |
|----|--------------|---------|
| CN | 203930883 U  | 11/2014 |

(Continued)

OTHER PUBLICATIONS

Extended European Search Report for European Patent Application No. 16891901 dated May 2, 2018.

*Primary Examiner* — John B Strege
(74) *Attorney, Agent, or Firm* — Heslin Rothenberg Farley & Mesiti P.C.

(57) ABSTRACT

A screen assembly with a fingerprint module includes: a transparent cover, a display module, and a fingerprint module. The display module is fixed to an inner surface of the transparent cover, and the display module includes a display area and a non-display area. The transparent cover has a fingerprint opening, and at least a portion of the fingerprint opening is in a projection area of the non-display area on the transparent cover. The fingerprint module is fixed to the transparent cover and is located in the fingerprint opening.

18 Claims, 7 Drawing Sheets

(56) References Cited

U.S. PATENT DOCUMENTS

| | | | | |
|---|---|---|---|---|
| 2017/0357842 A1* | 12/2017 | Park | .................... | G06K 9/0002 |
| 2017/0372123 A1* | 12/2017 | Kim | .................... | G06F 3/0412 |
| 2018/0039815 A1* | 2/2018 | Jung | ................ | G06K 9/00013 |
| 2018/0052554 A1* | 2/2018 | Zhang | .................. | G06F 3/0412 |
| 2018/0052561 A1* | 2/2018 | Wu | ...................... | G06F 3/0416 |
| 2018/0060641 A1* | 3/2018 | Kim | .................. | G06K 9/00013 |
| 2018/0068166 A1* | 3/2018 | Zeng | ................... | G02F 1/1333 |
| 2018/0088712 A1* | 3/2018 | Kim | .................. | G02F 1/13338 |
| 2019/0037060 A1* | 1/2019 | Yu | .................... | G06K 9/00053 |

FOREIGN PATENT DOCUMENTS

| | | |
|---|---|---|
| CN | 204009946 U | 12/2014 |
| CN | 105589592 A | 5/2015 |
| CN | 105159409 A | 12/2015 |
| CN | 205545606 U | 8/2016 |
| CN | 105975001 A | 9/2016 |
| KR | 20120031146 A | 3/2012 |
| WO | 2016028592 A1 | 2/2016 |

\* cited by examiner

SCREEN ASSEMBLY WITH A FINGERPRINT MODULE AND ELECTRONIC DEVICE

CROSS-REFERENCE TO RELATED APPLICATIONS

The present application is a continuation of international application No. PCT/CN2016/100961, filed on Sep. 29, 2016, which is hereby incorporated by reference in its entirety.

TECHNICAL FIELD

The present disclosure relates to electronic technologies, and in particular, to a screen assembly with a fingerprint module and an electronic device.

BACKGROUND

With the development of smart mobile terminals, mobile terminals are more and more frequently used in people's life and work. For example, a user may use a mobile device such as a mobile phone or a tablet computer to hold a video conference or to take outdoor photographs. To meet the requirements of user demands and usage scenes, it is desired to have a thinner mobile terminal with a larger screen, a fingerprint unlocking function, dual cameras, and the like.

At present, a typical mobile terminal is difficult to support having both multiple rear-facing cameras and a fingerprint button. When multiple rear-facing cameras are disposed at the top of the back face of a mobile phone, a display module is frontally mounted as shown in FIG. 1 and FIG. 2. That is, a display screen flexible printed circuit board (FPC) is disposed below a screen. In this case, a space at the top of the mobile phone is reserved for the rear-facing cameras. Due to the existence of the display screen FPC below the screen, there is an insufficient space at the bottom of the mobile phone to arrange a front-facing fingerprint button. When a fingerprint button is disposed at the bottom of the front face of the mobile phone, as shown in FIG. 3 the display module is reversely mounted. That is, the display screen FPC is disposed at the top of the screen. In this case, a space at the bottom of the mobile phone is reserved for the fingerprint button. Due to the existence of the display screen FPC above the screen, there is an insufficient space at the top of the mobile phone to arrange multiple rear-facing cameras.

To allow a mobile terminal to have both multiple rear-facing cameras and a fingerprint button, an existing technique is to extend the length of the lower part of the screen, i.e. extending the length of the entire body of the mobile phone. However, although an existing mobile terminal can have both multiple rear-facing cameras and a fingerprint button by extending the length of the lower part of the screen, this results an increased size of the terminal device and a higher production cost. In addition, due to the extended length of the body of the mobile phone, a screen-to-body ratio is decreased, which therefore lower user experience of the mobile phone.

SUMMARY

An objective of the present disclosure is to provide a screen assembly with a fingerprint module and an electronic device, so as to reduce the size of the electronic device or increase a screen-to-body ratio of the electronic device and to improve user experience.

To solve the above technical problem, some embodiments of the present disclosure provide a screen assembly with a fingerprint module. The screen assembly includes a transparent cover, a display module, and a fingerprint module. The display module is fixed to an inner surface of the transparent cover. The display module includes a display area and a non-display area. The transparent cover has a fingerprint opening. At least a portion of the fingerprint opening is in a projection area of the non-display area on the transparent cover. The fingerprint module is fixed to the transparent cover and is located in the fingerprint opening.

Some embodiments of the present disclosure provide an electronic device. The electronic device includes a housing, a mainboard, and a screen assembly with a fingerprint module. The mainboard is disposed in the housing. The screen assembly is fixed to the housing. The display module and the fingerprint module are connected to the mainboard, respectively.

Compared with existing techniques, in some embodiments of the present disclosure, the fingerprint opening is formed at the bottom of the transparent cover, so that at least a portion of the fingerprint opening is in the projection area of the non-display area on the transparent cover. The fingerprint module is fixed in the fingerprint opening, so that the fingerprint module is partially overlapped with the non-display area of the display module. Therefore, when the screen-to-body ratio remains unchanged, the size of the electronic device can be decreased and product costs can be reduced, thereby effectively improving the product competitiveness.

In addition, a first abutting portion is formed at a connection part between an outer surface of the transparent cover and an inner wall of the fingerprint opening. A second abutting portion that matches with the first abutting portion is formed on the fingerprint module. The fingerprint module is fixed to the transparent cover by means of the second abutting portion and the first abutting portion. This embodiment provides an example for fixing the fingerprint module to the transparent cover so that the fingerprint module can be reliably located in the fingerprint opening of the transparent cover.

In addition, the fingerprint module includes a fingerprint chip and a metal support frame. The fingerprint chip is disposed on a bottom wall of the metal support frame. A side wall of the metal support frame extends outward to form the second abutting portion. In this embodiment, as the fingerprint chip is disposed on the metal support frame, a structural example of front-mounting the fingerprint module on the transparent cover is provided. The metal support frame can support the fingerprint module to prevent the fingerprint module from being collapsed under a great pressing force.

In addition, a first fixing portion is formed at a connection part between the inner surface of the transparent cover and an inner wall of the fingerprint opening. A second fixing portion that matches with the first fixing portion is formed on the fingerprint module. The fingerprint module is fixed to the transparent cover via the second fixing portion and the first fixing portion. In this embodiment, another example of fixing the fingerprint module on the transparent cover is provided so that the fingerprint module can be reliably located in the fingerprint opening of the transparent cover.

In addition, the fingerprint module includes a fingerprint chip, a metal ring, and a carrier plate. The carrier plate has a carrier portion and the second fixing portion extending from the carrier portion. Both the fingerprint chip and the metal ring are fixed to the carrier portion of the carrier plate. The fingerprint chip is located in the metal ring. In this embodiment, a structural example of reverse-mounting the fingerprint module on the transparent cover is provided. Both the fingerprint chip and the metal ring are fixed to the carrier plate so that the carrier plate can support the fingerprint module to prevent the fingerprint module from being collapsed under a great pressing force.

In addition, the fingerprint module further includes a fingerprint cover and a fingerprint circuit board. The fingerprint chip is located between the fingerprint cover and the fingerprint circuit board. In this embodiment, a specific example of the fingerprint module is provided.

In addition, a bottom surface of the fingerprint module is flush with the inner surface of the transparent cover. In this embodiment, a specific position relationship between the fingerprint module and the transparent cover is provided.

In addition, there is a gap between the non-display area and the inner surface of the transparent cover. A bottom surface of the fingerprint module protrudes from the inner surface of the transparent cover by a protrusion distance less than the width of the gap. By controlling a protrusion distance to be less than the gap between the non-display area and the inner surface of the transparent cover, it can be achieved that the fingerprint module and the display module do not interfere with each other. In this embodiment, another specific position relationship between the fingerprint module and the transparent cover is provided.

In addition, the electronic device further includes multiple rear-facing cameras. The housing has multiple camera openings corresponding to the multiple rear-facing cameras, and the multiple camera openings and the fingerprint opening are located on opposite sides of the display area. The multiple rear-facing cameras are mounted on the mainboard and are located in the multiple camera openings. In this embodiment, a fingerprint opening and at least one camera opening are formed on opposite sides of the display area so that the electronic device can have both multiple rear-facing cameras and a fingerprint button.

DETAILED DESCRIPTION

To make the objectives, technical solutions, and advantages of the present disclosure clearer, the following describes various embodiments of the present disclosure in details with reference to the accompanying drawings. A person of ordinary skill in the art can understand that in the embodiments of the present disclosure many technical details are provided to help readers better understand this application. However, it is understood that even without these technical details and various changes and modifications that are made based on the following embodiments, technical solutions to be protected by the claims of this application can still be achieved.

Figure 1:
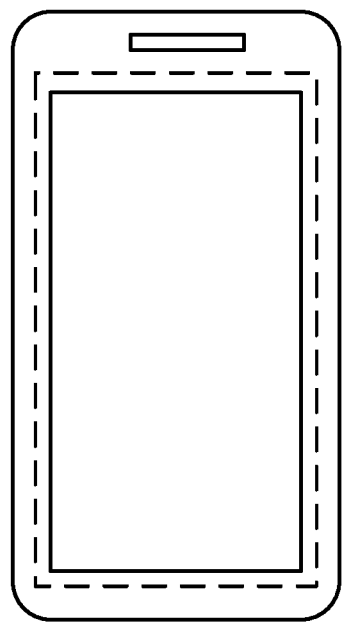
FIG. 1 is a schematic structural diagram of a front view of an existing electronic device.
Figure 2:
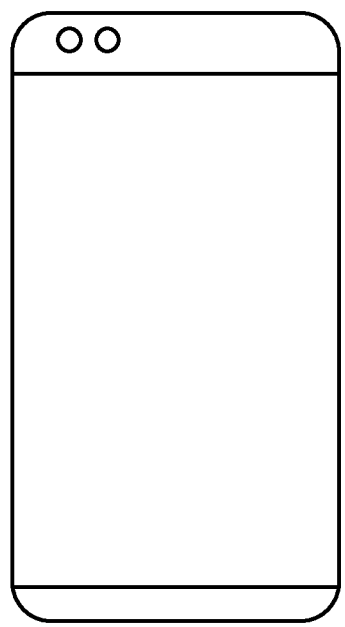
FIG. 2 is a schematic structural diagram of a back view of an existing electronic device.
Figure 3:
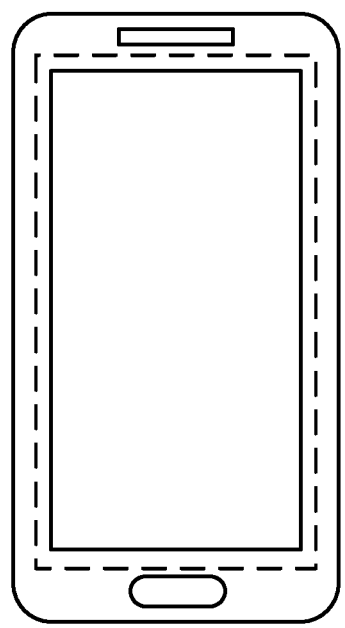
FIG. 3 is a schematic structural diagram of another existing electronic device.
Figure 4:
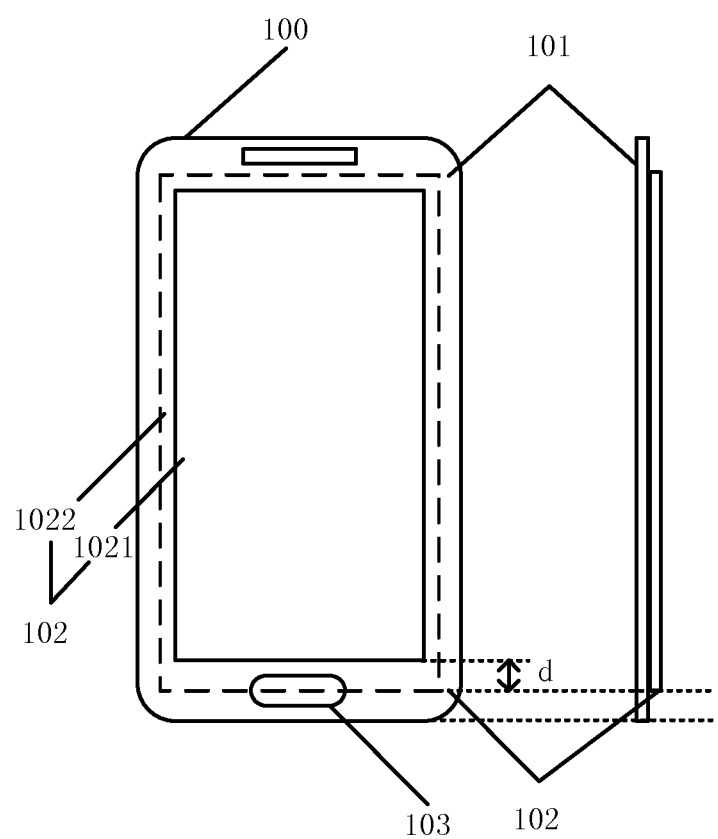
FIG. 4 is a schematic structural diagram of a screen assembly having a fingerprint module according to a first embodiment of the present disclosure.

A first embodiment of the present disclosure relates to a screen assembly with a fingerprint module, which can be mainly applied to an electronic device such as a smart phone or a tablet computer, which has both a fingerprint recognition function and a touch display function. A screen assembly in this embodiment can be referred to FIG. 4 and FIG. 5.

The screen assembly 100 includes a transparent cover 101, a display module 102, and a fingerprint module 103.

The transparent cover 101 can be used as a screen cover. The transparent cover 101 is a top layer of the entire screen assembly 100 and is in direct contact with the external. Because the transparent cover 101 may use a material of relatively high strength and hardness, the transparent cover 101 can protect the display module 102. In addition, a fingerprint opening is further formed at a bottom edge area (i.e. a "jaw" area) of the transparent cover 101 to receive the fingerprint module 103.

The transparent cover 101 may be a touch panel. The transparent cover 101 can provide a touch operation interface and detect a user's touch operation on the screen assembly 100. Alternatively, the transparent cover 101 may not have a touch operation detection function. For example, the transparent cover 101 may be a common cover glass, and is mainly used to protect the display module 102. If the transparent cover 101 does not have a touch operation detection function, the display module 102 can be a touch display module having both a touch detection function and a display function, to allow the screen assembly 100 to have a touch detection function.

The display module 102 includes a display area 1021 and a non-display area 1022. The display area 1021 displays interactive interface content between the electronic device and the user. An invisible area, i.e. the non-display area 1022, is peripherally arranged around the display area 1021. The non-display area 1022 is essentially an annular structure. In a preferred embodiment, the non-display area 1022 is 2 mm to 3 mm thinner than the display area 1021. That is, when the display module 102 is fixed to the transparent cover 101, the display area 1021 is in contact with the transparent cover 101 and there may be a gap, for example around 2 mm, between the non-display area 1022 and the transparent cover 101.

At least a portion of the fingerprint opening, which is formed at the bottom edge area of the transparent cover 101, is located in a projection area that the non-display area 1022 projects onto the transparent cover 101. Specifically, in the display module 102 of this embodiment, the width d of the non-display area 1022 adjacent to a bottom side (corresponding to a bottom of the electronic device) of the display area 1021 usually ranges from 4 mm to 5 mm. Therefore, generally at least a portion of the fingerprint opening is arranged in the non-display area 1022 adjacent to the bottom side of the display area 1021. However, this is not limited in this embodiment.

In a specific embodiment, the fingerprint opening may be partially located in the non-display area 1022, or may be entirely located in the non-display area 1022. A person skilled in the art may design a specific position of the fingerprint opening according to the size of the fingerprint opening (the size of the fingerprint opening is determined by the size of the fingerprint module) as well as the size and appearance of the electronic device.

Figure 5:
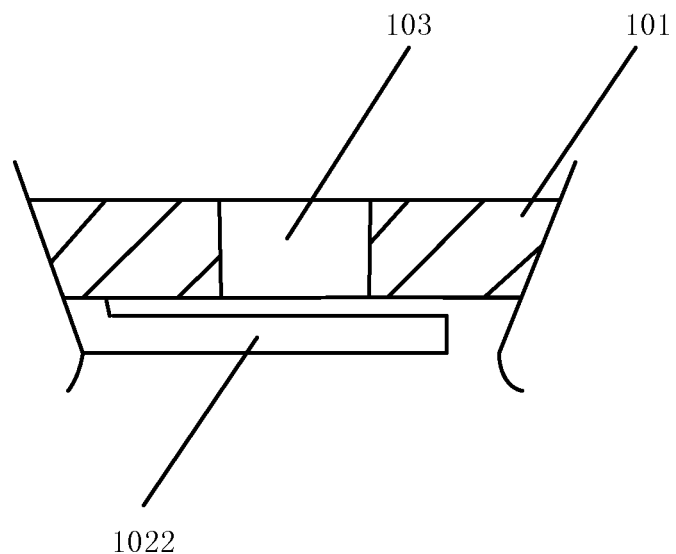
FIG. 5 is a partial schematic structural diagram of a screen assembly having a fingerprint module according to the first embodiment of the present disclosure.

As shown in FIG. 5, the fingerprint module 103 is fixed to the transparent cover 101 and is accommodated inside the fingerprint opening, and a gap exists between the fingerprint module 103 and the non-display area 1022 of the display module 102 below the fingerprint module 103 so as to avoid interference. The fingerprint module 103 is actually an ultra-thin fingerprint module. In this embodiment, the fingerprint module 103 may be directly pasted in the fingerprint opening by using an adhesive layer (that is, the adhesive layer is disposed between an outer wall of the fingerprint module 103 and an inner wall of the fingerprint opening). However, this is not limited in this embodiment.

According to the screen assembly 100 in this embodiment, the fingerprint module 103 is at least partially overlapped with the non-display area 1022 of the display module 102. Therefore, a width of the bottom edge of the device body can be shortened while maintaining a screen-to-body ratio, i.e. reducing an overall size of the electronic device. This can optimize an appearance design and reduce product costs. Alternatively, while the size of the electronic device maintains unchanged, a screen-to-body ratio can be increased to greatly facilitate an operation on a program (for example, a game program) that has a relatively high requirement of interactive operations, thereby effectively improving user experience, and product competitiveness.

Figure 6:
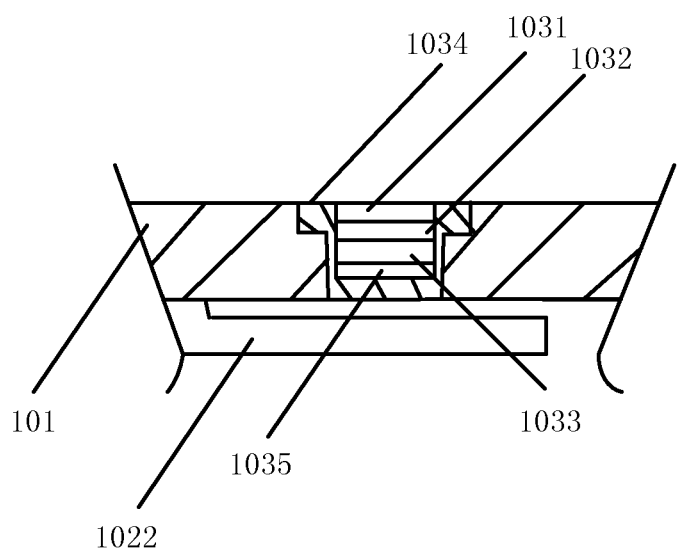
FIG. 6 is a partial schematic sectional view of a screen assembly having a fingerprint module according to a second embodiment of the present disclosure.

A second embodiment of the present disclosure relates to a screen assembly with a fingerprint module, as shown in FIG. 6. Further improvements that are based on the first embodiment are made in this embodiment. Specifically, the fingerprint module 103 includes a fingerprint cover 1031, a fingerprint chip 1032, a fingerprint FPC 1033, and a metal support frame 1034.

Specifically, the metal support frame 1034 can be a metal ring that is in contact with a finger when a user's finger presses the fingerprint module 103. The metal support frame 1034 has a bottom wall and a side wall extending from an edge of the bottom wall. The fingerprint FPC 1033 is disposed on the bottom wall. The fingerprint chip 1032 and the fingerprint cover 1031 are stacked above the fingerprint FPC 1033 in sequence. That is, the fingerprint chip 1032 is located between the fingerprint cover 1031 and the fingerprint FPC 1033. The fingerprint chip 1032 is configured to collect a fingerprint image of the user's finger and extract fingerprint features when the user's finger is pressed on the fingerprint cover 1031, and to transfer the fingerprint image and the fingerprint features to a mainboard of the electronic device by using the fingerprint FPC 1033. The fingerprint cover 1031 may be a glass cover, a ceramic cover, a sapphire cover, or a coating layer. The fingerprint cover 1031 is above the fingerprint chip 1032, and protects the fingerprint chip from external interference or damages.

In this embodiment, a step-shaped first abutting portion (or a step portion) 1011 is formed at a connection part between an outer surface of the transparent cover 101 and an inner wall of the fingerprint opening. The side wall of the metal support frame 1034 extends outward to form a second abutting portion (or an extending portion) 1034-1. The second abutting portion 1034-1 matches with the first abutting portion 1011 in shape and structure. The fingerprint module 103 may be reliably fixed to the transparent cover 101 by means of the second abutting portion 1034-1 and the first abutting portion 1011. The first abutting portion 1011 may be an annular groove, the second abutting portion 1034-1 may be an annular boss, and the annular boss is arranged to be firmly held by the annular groove. Therefore, when an external pressure is applied to the fingerprint module 103, the metal support frame 1034 can support the entire fingerprint module 103 firmly. In actual application, after the metal support frame 1034 and the transparent cover 101 are mounted by means of the first abutting portion 1011 and the second abutting portion 1034-1, the metal support frame 1034 and the transparent cover 101 may further be fixed to each other at a connection part by means of glue dispensing, to form an integral of the fingerprint module 103 and the transparent cover 101, thereby achieving waterproof and dustproof functions.

Further, optionally, the fingerprint module 103 in this embodiment may further include a supporting FPC reinforcement plate 1035, which is disposed between the fingerprint FPC 1033 and the bottom wall of the metal support frame 1034. In addition, a double-sided adhesive layer may be disposed between the fingerprint FPC 1033 and the FPC reinforcement plate 1035 and/or between the FPC reinforcement plate 1035 and the bottom wall of the metal support frame 1034, so as to enable adhesion and fixing.

It should be noted that disposing of the second abutting portion 1034-1 and the first abutting portion 1011 in this embodiment enables the fingerprint module 103 to be embedded from the front face of the transparent cover 101 (i.e. to be mounted in a direction from the outer surface of the transparent cover 101 to an inner surface of the transparent cover 101). This may be understood that the fingerprint module 103 is a front-mounted structure.

After the fingerprint module 103 is embedded from the front face of the transparent cover 101, a bottom surface of the fingerprint module 103 may be flush with the inner surface of the transparent cover 101; alternatively, a bottom surface of the fingerprint module 103 may protrudes from the inner surface of the transparent cover by a height less than the gap between the transparent cover 101 and the non-display area 1022 of the display module 102. As far as the fingerprint module 103 is not in contact with the non-display area 1022 of the display module 102 below the fingerprint module 103, interference can be reduced. The width of the gap between the transparent cover 101 and the non-display area 1022 of the display module 102 is generally around 2 mm. Therefore, if the bottom surface of the fingerprint module 103 protrudes from the inner surface of the transparent cover 101, a protrusion distance is generally less than or equal to 0.15 mm. Preferably, the protrusion distance is less than or equal to 0.1 mm.

In this embodiment, the fingerprint cover 1031 is flush with the outer surface of the transparent cover 101. During actual application, the fingerprint cover 1031 may be flush with the outer surface of the transparent cover 101, or slightly lower than the outer surface of the transparent cover 101. This is not limited herein.

It should be noted that in addition to the display area 1021 and the non-display area 1022, the display module 102 in this embodiment may further include an FPC extending from the non-display area 1022 of the display module 102, and at least part of the fingerprint module 103 is located in a projection area that the FPC projects onto the transparent cover 101. That is, the FPC of the display module 102 may be spatially overlapped with the fingerprint module. Therefore, a position of disposing the FPC of the display module 102 does not affect disposing of the fingerprint module.

Compared with the first embodiment, this embodiment provides a specific example of fixing the fingerprint module to the transparent cover. That is, a component of the fingerprint module 103 is placed on the metal support frame 1034, and is combined with the first abutting portion 1011 of the transparent cover 101 by means of the second abutting portion 1034-1 of the metal support frame 1034 to provide a reliable support for the fingerprint module 103, thereby effectively preventing the fingerprint module 103 from being collapsed under a large pressing force.

Figure 7:
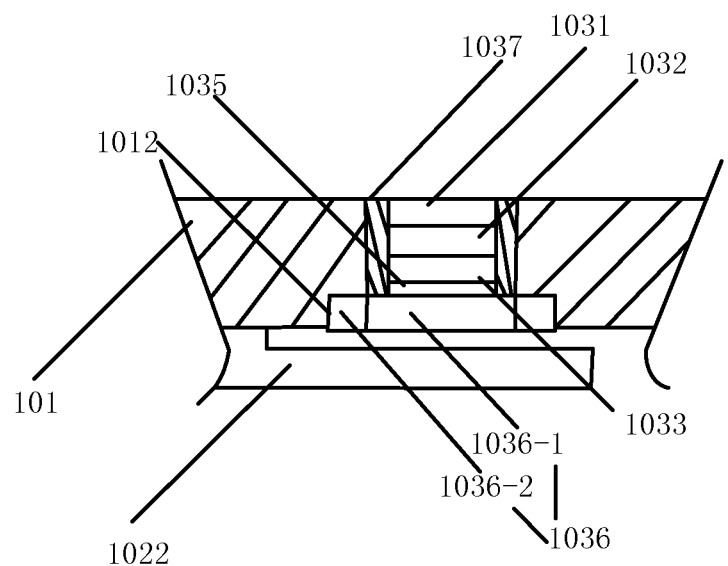
FIG. 7 is a partial schematic sectional view of a structure of a screen assembly having a fingerprint module according to a third embodiment of the present disclosure.

A third embodiment of the present disclosure relates to a screen assembly with a fingerprint module, as shown in FIG. 7. This embodiment is another improved embodiment that is based on the first embodiment. Specifically, the fingerprint module 103 includes a fingerprint cover 1031, a fingerprint chip 1032, a fingerprint FPC 1033, a carrier plate 1036, and a metal ring 1037.

Specifically, the carrier plate 1036 has a carrier portion 1036-1 and a second fixing portion 1036-2 extending from the carrier portion 1036-1. The second fixing portion 1036-2 actually extends from an edge area of the carrier portion 1036-1 and is an annular structure. More specifically, the carrier portion 1036-1 is located in a middle area of the carrier plate 1036, the second fixing portion 1036-2 is located in an edge area of the carrier plate 1036, and the second fixing portion 1036-2 extends from a peripheral edge of the carrier portion 1036-1 and is located at a same plane of the carrier portion 1036-1. The metal ring 1037 is disposed on the carrier portion 1036-1, the fingerprint FPC 1033 is disposed on the carrier portion 1036-1 and arranged in the metal ring 1037, and the fingerprint chip 1032 and the fingerprint cover 1031 are stacked above the fingerprint FPC 1033 in sequence. That is, the fingerprint chip 1032 is located between the fingerprint cover 1031 and the fingerprint FPC 1033. The fingerprint chip 1032 is configured to collect a fingerprint image of a user's finger and extract fingerprint features when the user's finger is pressed on the fingerprint cover 1031, and to transfer the fingerprint image and the fingerprint features to a mainboard of the electronic device by using the fingerprint FPC 1033. The fingerprint cover 1031 is located on the fingerprint chip 1032 and protects the fingerprint chip from outside interference or damages.

In this embodiment, a step-shaped first fixing portion 1012 is formed at a connection part between an inner surface (i.e. a bottom surface) of the transparent cover 101 and the inner wall of the fingerprint opening. The carrier portion 1036-1 of the carrier plate 1036 extends outward to form the second fixing portion 1036-2, and the second fixing portion 1036-2 matches with the first fixing portion 1012 in shape and structure. The fingerprint module 103 may be reliably fixed to the transparent cover 101 by means of the second fixing portion 1036-2 and the first fixing portion 1012. The first fixing portion 1012 may be an annular groove formed at the bottom surface of the transparent cover 101, and the second fixing portion 1036-2 may be an annular platform; the annular platform may be entirely embedded in the annular groove and be in close contact with the annular groove. Therefore, when an external pressing force is applied on the fingerprint module 103, the carrier plate 1036 can support the entire fingerprint module 103 firmly. During actual application, after the carrier portion 1036-1 of the carrier plate 1036 and the transparent cover 101 are mounted and fixed by means of the first fixing portion 1012 and the second fixing portion 1036-2, the carrier portion 1036-1 and the transparent cover 101 may further be fixed to each other at a connection part by means of glue dispensing, to form an integral of the fingerprint module 103 and the transparent cover 101, thereby achieving waterproof and dustproof functions.

Further, optionally, the fingerprint module 103 in this embodiment may further include a supporting FPC reinforcement plate 1035, which is disposed between the fingerprint FPC 1033 and the carrier portion 1036-1 of the carrier plate 1036. In addition, a double-sided adhesive layer may be disposed both between the fingerprint FPC 1033 and the FPC reinforcement plate 1035 and between the FPC reinforcement plate 1035 and the carrier portion 1036-1, so as to enable adhesion and fixing.

It should be noted that a structural arrangement between the second fixing portion 1036-2 and the first fixing portion 1012 in this embodiment enables the fingerprint module 103 to be embedded from a back face of the transparent cover 101 (to be mounted in a direction from an inner surface of the transparent cover 101 to an outer surface of the transparent cover 101). That is, it can be understood that the fingerprint module 103 is of a reverse-mounted structure.

After the fingerprint module 103 is embedded from the back face of the transparent cover 101, a bottom surface of the fingerprint module 103 is flush with the inner surface of the transparent cover 101; alternatively, a bottom surface of the fingerprint module 103 may protrude from the inner surface of the transparent cover by a height less than the gap between the transparent cover 101 and the non-display area 1022 of the display module 102, provided that the fingerprint module 103 is not in contact with the non-display area 1022 directly below the fingerprint module 103 to reduce interference. The width of the gap between the transparent cover 101 and the non-display area 1022 of the display module 102 is generally around 2 mm. Therefore, if the bottom surface of the fingerprint module 103 protrudes from the inner surface of the transparent cover 101, a protrusion distance is generally less than or equal to 0.15 mm. Preferably, the protrusion distance is less than or equal to 0.1 mm.

Figure 8:
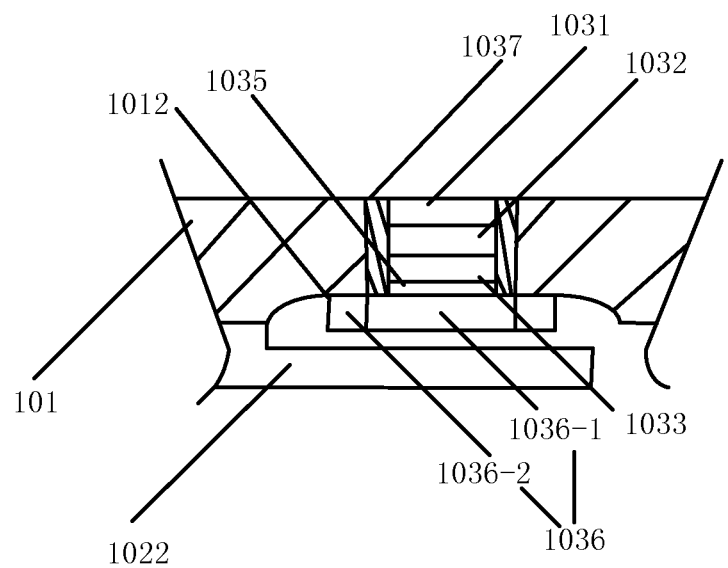
FIG. 8 is a partial schematic sectional view of another structure of a screen assembly having a fingerprint module according to the third embodiment of the present disclosure.

Alternatively, in actual application, an acceptance space such as an arc-shaped groove may be formed by means of a concave arrangement at the connection part between the inner surface of the transparent cover 101 and the inner wall of the fingerprint opening. A specific structure is shown in FIG. 8. The carrier plate 1036 is mounted in the arc-shaped groove of the transparent cover 101, and the carrier plate 1036 is flush with a horizontal plane on which an edge of the arc-shaped groove is located; alternatively, the carrier plate 1036 may protrude from a horizontal plane on which an edge of the arc-shaped groove is located by a protrusion distance not greater than 0.15 mm. After the carrier portion 1036-1 of the carrier plate 1036 and the transparent cover 101 are mounted and fixed to each other by means of the first fixing portion 1012 and the second fixing portion 1036-2, the entire carrier plate 1036 is firmly bound to the transparent cover 101 by means of glue dispensing in a contact area, forming an integral of the fingerprint module 103 and the transparent cover 101, thereby enabling waterproof and dustproof functions. In addition, the pressing force on the fingerprint module 103 can be spread to the entire transparent cover, so as to better support the pressing force of an entire finger.

It should be noted that in addition to the display area 1021 and the non-display area 1022, the display module 102 in this embodiment may further include an FPC that extends from the non-display area 1022 of the display module 102, and at least part of the fingerprint module 103 is located in a projection area that the FPC projects on the transparent cover 101. That is, the FPC of the display module 102 may be spatially overlapped with the fingerprint module. Therefore, a disposing position of the FPC of the display module 102 does not affect disposing of the fingerprint module.

Compared with the first embodiment, this embodiment provides another specific example of fixing the fingerprint module on the transparent cover. That is, a component of the fingerprint module 103 is placed on the carrier portion 1036-1 of the carrier plate 1036, and is combined with the first fixing portion 1012 of the transparent cover 101 by means of the second fixing portion 1036-2 of the carrier plate 1036 to provide reliable support to the fingerprint module 103, thereby effectively preventing the fingerprint module 103 from being collapsed under a large pressing force.

A fourth embodiment of the present disclosure relates to an electronic device. Because a front view of the electronic device in this embodiment is similar to the diagram of the screen assembly in the first embodiment, the details can be referred to FIG. 4.

The electronic device in this embodiment mainly includes a housing, a mainboard, and the screen assembly in the second or third embodiment.

Specifically, the mainboard is disposed in the housing, and the screen assembly is fixed to the housing. The display module and the fingerprint module are connected to the mainboard, respectively. Consequently, it is convenient for the mainboard to execute corresponding commands according to operations on different components.

The mainboard is a core device of the electronic device, and integrates all operation management functions for the electronic device. The mainboard is configured to control the electronic device to achieve user interaction. The mainboard is disposed in the housing and is protected from external interference, and it is convenient for the user to use.

As the screen assembly in this embodiment can be the screen assembly in the second or third embodiment, this embodiment may be implemented with reference to the second or the third embodiment. Related technical details described in the second or third embodiment are still effective in this embodiment, and technical effects in the second or the third embodiment can still be achieved in this embodiment. To avoid unnecessary repetition, more details are not described herein.

Figure 9:
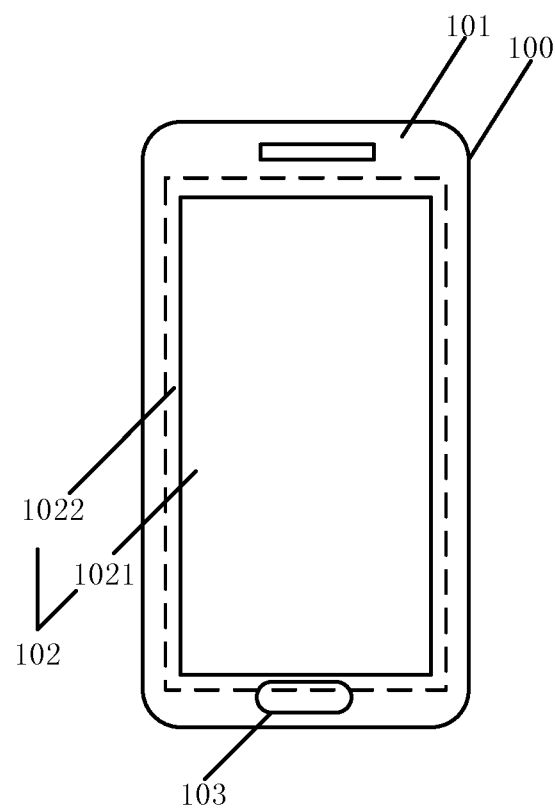
FIG. 9 is a schematic structural diagram of a front view of an electronic device according to a fifth embodiment of the present disclosure.
Figure 10:
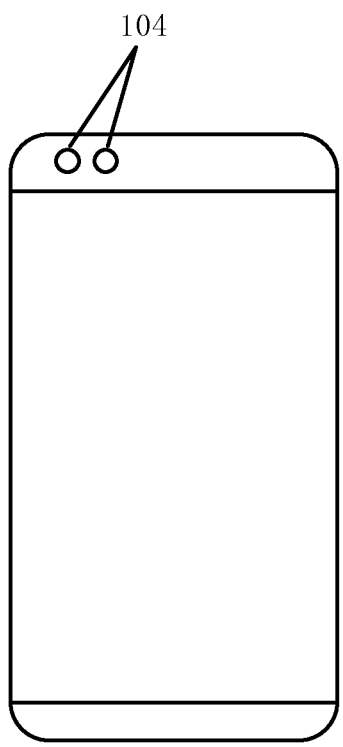
FIG. 10 is a schematic structural diagram of a back view of an electronic device according to the fifth embodiment of the present disclosure.

A fifth embodiment of the present disclosure relates to an electronic device. This embodiment is substantially similar to the fourth embodiment. A main difference is as follows: in the fourth embodiment, when the size of the electronic device remains unchanged, a screen-to-body ratio is increased; or, when the screen-to-body ratio remains unchanged, the overall size of the electronic device is decreased and the fingerprint module is mounted at the bottom of the screen assembly. In this embodiment, when the size of the screen assembly (i.e. the electronic device) remains unchanged, and the screen-to-body ratio remains unchanged or is slightly increased, multiple rear-facing cameras and a fingerprint module are all mounted on the electronic device. More details can be referred to FIG. 9 and FIG. 10.

The electronic device mainly includes a housing, a mainboard, multiple rear-facing cameras, and a screen assembly with a fingerprint module.

The housing has multiple camera openings 104 corresponding to the multiple rear-facing cameras. The multiple camera openings 104 and the fingerprint opening are located on opposite sides of the display area 1021. The multiple rear-facing cameras are mounted on the mainboard and are received in the multiple camera openings 104. Preferably, two rear-facing cameras are provided in this embodiment. Accordingly, two camera openings are arranged and correspond to the two rear-facing cameras, respectively. In actual application, the specific number of the rear-facing cameras may be designed according to the requirements and structure of the electronic device, and is not limited to two.

According to the electronic device provided by this embodiment, when the size of the screen assembly (i.e. the electronic device) remains unchanged and the screen-to-body ratio remains unchanged or is slightly increased, the electronic device has both a fingerprint module and multiple rear-facing cameras, thereby greatly improving product competitiveness.

A person of ordinary skill in the art can understand that, the above embodiments are specific examples for implementation of the present disclosure. However, in actual application and practice, various changes or modifications can be made to the form and details of the above examples without departing from the spirit and scope of the present disclosure.

What is claimed is:

1. A screen assembly with a fingerprint module, comprising: a transparent cover, a display module, and a fingerprint module; wherein:
   the display module is fixed to an inner surface of the transparent cover, and the display module comprises a display area and a non-display area;
   the transparent cover comprises a fingerprint opening, and at least a portion of the fingerprint opening is in a projection area of the non-display area on the transparent cover; and
   the fingerprint module is fixed to the transparent cover and is arranged in the fingerprint opening;
   a gap is formed between the non-display area and the inner surface of the transparent cover; and
   a bottom surface of the fingerprint module protrudes from the inner surface of the transparent cover by a protrusion distance less than the width of the gap.

2. The screen assembly with a fingerprint module according to claim 1, wherein a first abutting portion is formed at a connection part between an outer surface of the transparent cover and an inner wall of the fingerprint opening;
   wherein a second abutting portion is formed on the fingerprint module, and the second abutting portion matches with the first abutting portion; and
   wherein the fingerprint module is fixed to the transparent cover by the second abutting portion and the first abutting portion.

3. The screen assembly with a fingerprint module according to claim 2, wherein the fingerprint module comprises a fingerprint chip and a metal support frame;
   wherein the fingerprint chip is disposed on a bottom wall of the metal support frame; and
   wherein a side wall of the metal support frame extends outward to form the second abutting portion.

4. The screen assembly with a fingerprint module according to claim 1, wherein:

a first fixing portion is formed at a connection part between the inner surface of the transparent cover and an inner wall of the fingerprint opening;

a second fixing portion is formed on the fingerprint module, and the second fixing portion matches with the first fixing portion; and the fingerprint module is fixed to the transparent cover by the second fixing portion and the first fixing portion.

5. The screen assembly with a fingerprint module according to claim 4, wherein the fingerprint module comprises a fingerprint chip, a metal ring, and a carrier plate; wherein:

the carrier plate has a carrier portion and the second fixing portion, and the second fixing portion extends from the carrier portion; and both the fingerprint chip and the metal ring are fixed to the carrier portion of the carrier plate, and the fingerprint chip is located in the metal ring.

6. The screen assembly with a fingerprint module according to claim 5, wherein the fingerprint module further comprises a fingerprint cover and a fingerprint circuit board; and wherein the fingerprint chip is located between the fingerprint cover and the fingerprint circuit board.

7. The screen assembly with a fingerprint module according to claim 1, wherein a bottom surface of the fingerprint module is flush with the inner surface of the transparent cover.

8. The screen assembly with a fingerprint module according to claim 1, wherein the display module further comprises a flexible printed circuit board;

wherein the flexible printed circuit board extends from the non-display area; and wherein at least part of the fingerprint module is located in a projection area of the flexible printed circuit board on the transparent cover.

9. An electronic device, comprising: a housing, a mainboard, and a screen assembly with a fingerprint module; wherein:

the screen assembly comprises a transparent cover, a display module, and a fingerprint module;

the display module is fixed to an inner surface of the transparent cover, and the display module comprises a display area and a non-display area;

the transparent cover comprises a fingerprint opening, and at least a portion of the fingerprint opening is in a projection area of the non-display area on the transparent cover;

the fingerprint module is fixed to the transparent cover and is arranged in the fingerprint opening;

a gap is formed between the non-display area and the inner surface of the transparent cover;

and a bottom surface of the fingerprint module protrudes from the inner surface of the transparent cover by a protrusion distance less than the width of the gap;

the mainboard is disposed in the housing; and the screen assembly is fixed to the housing, and the display module and the fingerprint module are connected to the mainboard, respectively.

10. The electronic device according to claim 9, wherein the electronic device further comprises multiple rear-facing cameras;

wherein the housing has multiple camera openings corresponding to the multiple rear-facing cameras, and the multiple camera openings and the fingerprint opening are located on opposite sides of the display area; and wherein the multiple rear-facing cameras are mounted on the mainboard and are located in the multiple camera openings.

11. The electronic device according to claim 10, wherein the multiple rear-facing cameras comprise two rear-facing cameras arranged in the electronic device.

12. The electronic device according to claim 9, wherein a first abutting portion is formed at a connection part between an outer surface of the transparent cover and an inner wall of the fingerprint opening;

wherein a second abutting portion is formed on the fingerprint module, and the second abutting portion matches with the first abutting portion; and wherein the fingerprint module is fixed to the transparent cover by the second abutting portion and the first abutting portion.

13. The electronic device according to claim 12, wherein the fingerprint module comprises a fingerprint chip and a metal support frame;

wherein the fingerprint chip is disposed on a bottom wall of the metal support frame; and wherein a side wall of the metal support frame extends outward to form the second abutting portion.

14. The electronic device according to claim 9, wherein:

a first fixing portion is formed at a connection part between the inner surface of the transparent cover and an inner wall of the fingerprint opening;

a second fixing portion is formed on the fingerprint module, and the second fixing portion matches with the first fixing portion; and the fingerprint module is fixed to the transparent cover by means of the second fixing portion and the first fixing portion.

15. The electronic device according to claim 14, wherein the fingerprint module comprises a fingerprint chip, a metal ring, and a carrier plate; wherein:

the carrier plate has a carrier portion and the second fixing portion, and the second fixing portion extends from the carrier portion; and both the fingerprint chip and the metal ring are fixed to the carrier portion of the carrier plate, and the fingerprint chip is located in the metal ring.

16. The electronic device according to claim 15, wherein the fingerprint module further comprises a fingerprint cover and a fingerprint circuit board; and wherein the fingerprint chip is located between the fingerprint cover and the fingerprint circuit board.

17. The electronic device according to claim 9, wherein a bottom surface of the fingerprint module is flush with the inner surface of the transparent cover.

18. The electronic device according to claim 9, wherein the display module further comprises a flexible printed circuit board; wherein:

the flexible printed circuit board extends from the non-display area; and at least part of the fingerprint module is located in a projection area of the flexible printed circuit board on the transparent cover.

* * * * *